April 5, 1955  J. F. G. PETIT  2,705,772
REGULATING GENERATOR

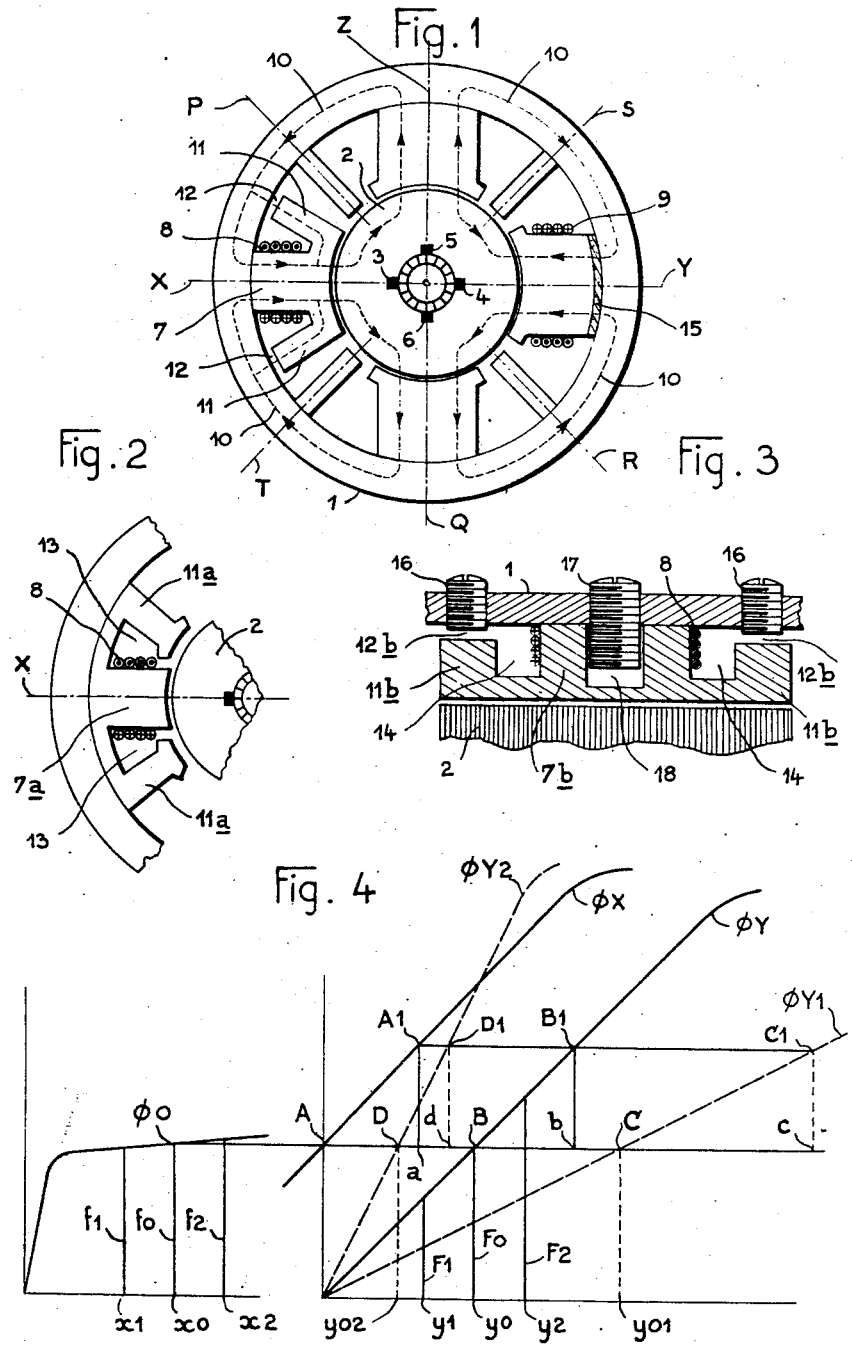

Filed May 14, 1951  3 Sheets-Sheet 3

Inventor:
Jean F. G. Petit
by J. Delattre-Seguy
Attorney

United States Patent Office 2,705,772
Patented Apr. 5, 1955

2,705,772

REGULATING GENERATOR

Jean François Gabriel Petit, Paris, France, assignor to Societe d'Exploitation de Brevets, Boulogne-sur-Seine, France, a French body corporate Application May 14, 1951, Serial No. 226,124

Claims priority, application France May 26, 1950

13 Claims. (Cl. 322—28)

The invention relates to direct-current regulating machines of the type described in the co-pending application Serial No. 90,018, filed April 27, 1949, which issued as Patent No. 2,625,674 dated January 13, 1953.

Such machines comprise a multiple field structure in which a magnetic comparison standard is obtained by means of a first pole of one polarity having a saturated flux path so as to produce a flux of substantially constant value, and a second pole of the same polarity adapted to produce under excitation by a variable condition a flux variable over a range including the value of said substantially constant flux, whereby these two poles are equal in strength for a definite value of said condition and any departure of the latter from said definite value produces between these two poles a flux unbalance which is correlated to said departure and induces between the equipolar brushes associated with these two poles a corresponding circulating current, the latter being used as a correcting means for controlling said variable condition in such a manner as to reduce said flux unbalance in order to secure regulation of said variable condition. In such a field structure the said two poles are designed with different degrees of magnetic saturation, said first pole being more saturable than the other so as to operate normally at saturation; consequently the mean value of the main flux is imposed by the saturated state of said first pole and therefore is not liable to vary.

The invention has for its main object to devise regulating machines which, while maintaining the regulating characteristics of the above mentioned machines, permit relatively large variations of the main flux.

The invention consists in a direct current machine of the type referred to, which comprises a magnetic part adapted to form a parallel path with respect to said saturated flux path as disclosed in said copending application, as aforesaid, for passing a variable additional flux whereby the main flux of the machine resulting from the superposition of both these fluxes may be varied without altering the saturation of said flux path.

The invention will become apparent from the following description of several embodiments thereof shown by way of example in the accompanying drawings, where like parts are denoted by like reference characters throughout the various figures.

Fig. 1 shows the field structure of a four-pole machine according to the invention;

Fig. 2 shows a modified form of a pole piece used in the field structure of Fig. 1;

Fig. 3 is a longitudinal sectional view of another modified form of the same pole piece;

Fig. 4 shows flux diagrams explanatory of the operation of the machine;

Figure 5:
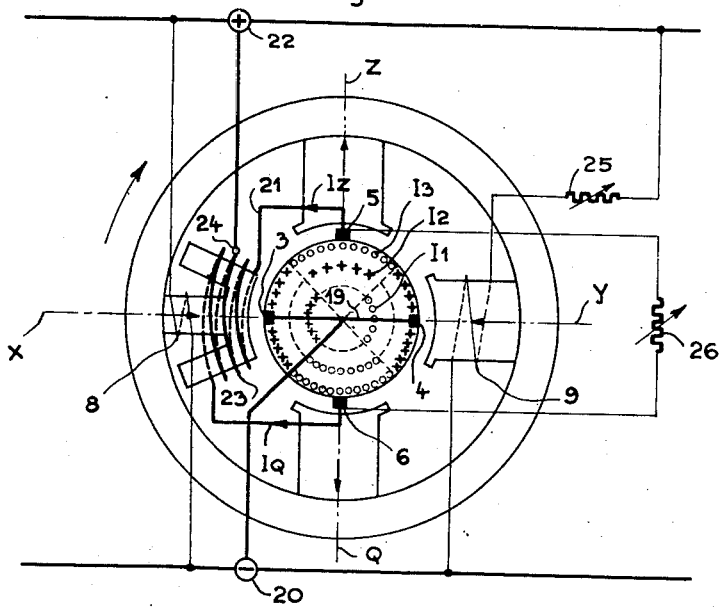
Fig. 5 is a schematic showing of the field structure and circuit of a machine according to the invention adapted to operate as a self-regulated generator.

Referring to Fig. 1 the field structure of the machine comprises a frame 1 having four main poles denoted by their axes X, Y, Z and Q and eventually four interpoles also denoted by their axes P, R, S and T. These poles are associated with an armature 2 having a four-pole multiple winding and four commutator brushes 3, 4, 5 and 6 arranged relatively to the poles in the same commutating position as in conventional four-pole machines.

The pole X comprises a magnetic part adapted to operate normally at magnetic saturation so as to cause the pole X to produce a substantially constant flux. Such magnetic part may consist in the core 7 of pole X and saturation thereof is for example obtained by means of a saturation winding consisting in a coil 8 provided on this core. The pole Y is excited for the same magnetic polarity as pole X by means of a regulation winding which for example consists in a coil 9 provided on this pole. Both these coils, in which the direction of current is materialized by circles (O) or crosses (+) respectively denoting a current which flows out of, or into the figure, produce in the field structure a four-pole flux, shown by the dotted lines 10, the mean value of which is substantially constant since it is imposed by the saturated state of core 7.

However, and as will be seen hereinafter, the total flux of the machine will result from the superposition, in the same field structure, of the said substantially constant flux and of an additional flux which should be allowed to vary in spite of the limitation imposed by the saturated state of core 7 and without altering this saturated state. To this end the field structure of the machine according to this invention will comprise a magnetic part adapted to form a parallel path with respect to that of said substantially constant flux, in order to pass therein said additional flux. This magnetic part may consist in a magnetic shunt associated with the core 7 and extending between the armature 2 and the frame 1. As shown in Fig. 1 said magnetic shunt may be made in the form of radial tips 11 projecting from the top of pole X toward the frame 1. An air-gap 12 may be provided in the path of the flux in this magnetic shunt in order to limit or control the amount of the flux therein.

According to the modified form illustrated in Fig. 2 the pole X may be made of a usual multiple pole piece provided with two slots 13 providing a core 7a to be saturated and two radial polar projections 11a forming the magnetic shunt.

The pole X may also consist, as shown in Fig. 3 in a pole piece of conventional form having two slots 14 transverse to the axis of the machine, which divide longitudinally the pole into a central core 7b and two end projections 11b. The latter may be spaced from the frame 1 so as to provide an air-gap 12b.

In order to easily understand the regulating function of a machine involving the field structure above described, it is convenient to consider this machine as resulting, as regards the flux distribution therein, from the combination of the two half-machines lying on the left and on the right of the axis ZQ and called respectively half-machine X and half-machine Y. Referring now to Fig. 4, the curve $\phi_0$ in the diagram of the left part of the figure represents the flux in the half-machine X versus the ampere-turns of the winding 8, while in the juxtaposed diagram the curve $\phi_Y$ represents the flux in the half-machine Y versus the ampere-turns of the winding 9. The value of the substantially constant flux corresponding to the saturated part of the curve $\phi_0$ is mainly conditioned by the iron and air-gap reluctances of the component parts of the pole X. These reluctances will be so rated that the value of said substantially constant flux is included in the variable flux range of the curve $\phi_Y$.

It will be assumed now that the windings 8 and 9 are energized in dependence of the same condition, for instance the same supply voltage, and that, for some given value $U_0$ of this voltage, the ampere-turns of winding 8 are adjusted to a value $x_0$ producing in the half-machine X a flux $f_0$, corresponding to the saturated portion of the curve $\phi_0$, while the ampere-turns of winding 9 are adjusted to a value $y_0$ producing in the half-machine Y a flux $F_0$ equal to $f_0$. It results therefrom in the machine a four-pole flux, hereinafter called reference flux, the value of which is practically independent of a change in the supply voltage, due to the saturated state of core 7. However the distribution of the reference flux, which is symmetrical when the supply voltage has the value $U_0$, becomes markedly unsymmetrical as soon as the supply voltage departs from the value $U_0$, due to the fact that the flux represented by the saturated portion of curve $\phi_0$ is practically constant while the flux represented by the unsaturated portion of curve $\phi_Y$ changes rapidly in response to a change in the ampere-turns of winding 9. Hence, if the supply voltage falls below $U_0$, thus yielding ampere-turns $x_1$ and $y_1$, the flux $f_1$ of pole X is higher than the flux $F_1$ of pole Y. Conversely with the supply voltage rising above $U_0$, thus yielding ampere-turns $x_2$ and $y_2$, the flux $f_2$ of pole X will be lower than the flux $F_2$ of pole Y. In both latter cases, there exists in the machine, in addition to the four-pole reference flux, a bipolar unbalance flux directed along axis XY and correlated, in magnitude and direction, to the departure of the supply voltage from the normal value $U_0$.

As regards the induced E. M. F.'s, it will be noted that the potentials of all brushes are equal in absolute value when the reference flux is symmetrical, but that the presence of an unbalance flux between poles X and Y has for its effect to induce between the equipolar brushes 3 and 4, or primary brushes, a potential difference which likewise is correlated to the voltage departure.

There will be now considered, in conjunction with the flux diagram on the left of Fig. 4, the case where an additional four-pole flux is superposed to the four-pole reference flux. It will be assumed that the poles X and Y are magnetized with fixed ampere-turns $x_0$ and $y_0$ and that such an additional flux is excited by means of additional ampere-turns (not shown in Fig. 1 for the sake of clarity) arranged on the pole X, i. e. about the unit formed by the core 7 and the shunt 11, and on the pole Y, or on poles Z and Q.

In the half-machine Y the superposition of the additional flux to the reference flux is algebraic due to the unsaturated state of pole Y, and thence yields a resultant flux which may be represented by the same curve $\phi_Y$. In the half-machine X the superposition of both fluxes is not algebraic, due to the different saturation states of the core 7 and the magnetic shunt 11, and yields a resultant flux whose variations versus the additional ampere-turns on pole X are represented by a curve $\phi_X$ which intersects the flux axis at a point A, the ordinate of which represents the value of the reference flux.

In the absence of additional ampere-turns the value of the flux in the machine is given by the height of the line AB. The curves $\phi_X$ and $\phi_Y$ being assumed to be parallel, if the additional ampere-turns on poles X and Y are given equal values such as A$a$ and B$b$, the total flux in the machine increases from the value represented by the line AB to another value represented by the line $A_1B_1$ while remaining symmetrically distributed. It will be recognized that the superposition of an additional flux to the reference flux does not alter the regulating function resulting from the difference between the slopes of curves $\phi_0$ and $\phi_Y$. As a matter of fact any departure of the supply voltage from the value $U_0$ has the effect of modifying the ordinate of the point $B_1$ relatively to the point $A_1$ which entails a corresponding difference between the potentials of primary brushes 3 and 4.

The parallelism of curves $\phi_X$ and $\phi_Y$ is a particular case. With diverging curves such as $\phi_X$ and $\phi_Y{}^1$, a balanced reference flux is obtained as defined by the line AC, by setting the ampere-turns of windings 8 and 9 to values such as $x_0$ and $y_{01}$; but if an additional flux is to be superposed to the reference flux, it is necessary, in order to maintain a symmetrical distribution of the resultant total flux, to provide on poles X and Y additional ampere-turns A$a$ and C$c$ which are in the reverse ratio of the slopes of curves $\phi_X$ and $\phi_Y{}^1$. Similarly, with converging curves such as $\phi_X$ and $\phi_Y{}^2$, the additional ampere-turns A$a$ on pole X and the additional ampere-turns D$d$ on pole Y should also be in the reverse ratio of the slopes of curves $\phi_X$ and $\phi_Y{}^2$.

The desired ratio between the slopes of these curves may be obtained by suitably modifying the air-gap reluctances of either of poles X and Y.

In the case of the curve $\phi_Y$ the use of spacers such as 15 (Fig. 1) provides the desired slope. In the case of the curve $\phi_X$, the slope of the latter may be modified by varying the air-gap 12 of the magnetic shunt 11. The variation of such air-gap may be made progressive by using a device consisting as shown in Fig. 3 of plungers 16 adapted to move in regard of the projections 11$b$. It will be noted that a variation of the air-gap of the magnetic shunt entails a corresponding shift of the point A (Fig. 4) and thence a modification in the value of the reference flux. It is however possible to modify the value of the reference flux without varying the slope of curve $\phi_X$ by merely varying the section of the saturated core of pole X by providing for instance a plunger 17 (Fig. 3) adapted to move in a hole 18 of the core 7$b$.

There will be now described in conjunction with Fig. 5 the circuits of a generator with regulated output voltage using a field structure such as that described above and in which the curves $\phi_X$ and $\phi_Y$ are first assumed to be parallel.

The primary equipolar brushes 3 and 4 are interconnected through a primary brush connection 19 which in turn is connected to one output terminal 20 of the generator, while the equipolar brushes 5 and 6, or secondary brushes, are interconnected through a secondary brush connection 21, which in turn is connected to the other terminal 22 of the generator.

Self-excitation of the generator is afforded by connecting the windings 8 and 9 across the output terminals 20 and 22 of the generator.

The latter being driven clockwise builds up with its residual magnetism and supplies an increasing output voltage which makes for example the terminal 20 negative and the terminal 22 positive. The windings 8 and 9 subject to the increasing voltage excite the reference flux of the generator as shown by the arrows on the pole axes. As long as the speed is not sufficient for the generator to produce, under influence of the reference flux alone, the normal voltage $U_0$ for which the poles X and Y have equal strengths $f_0$ and $F_0$, there exists between these poles an unbalance flux directed from X toward Y which induces a corresponding potential difference between the negative brushes 3 and 4. The effect of this potential difference is to force in the circuit of these brushes a primary circulating current whose direction in the armature conductors is shown at $I_1$ by a layer of signs (+), and (O). This circulating current will be used to produce in the machine an additional flux adapted to assist the reference flux so as to allow the voltage of each its normal value $U_0$.

It would be possible to use directly this circulating current for the excitation of the additional ampere-turns, but for the purpose of increasing the sensitivity of the regulation, it is advantageous to use the same for producing an amplified potential difference between the secondary brushes 5 and 6 and to excite the additional ampere-turns by means of the secondary circulating current which results in the circuit of the latter brushes from said amplified potential difference. For this purpose another unbalance flux is produced between the poles Z and Q in dependence upon said primary circulating current. Such unbalance flux exists naturally due to the armature reaction resulting from the flow of primary circulating current $I_1$ in the armature conductors and hence induces between the secondary brushes 5 and 6 the desired amplified potential difference which in turn forces in the circuit of the latter brushes a secondary circulating current whose direction in the armature conductors is shown at $I_2$.

Among the known methods of producing the desired four-pole additional flux in response to the secondary circulating current the simplest one consists in using the secondary armature reaction as an exciting means. This secondary armature reaction which extends along axis XY has a value which may be expressed in ampere-turns by the product $$\frac{N}{8}I_2$$

N denoting the number of armature conductors. It is known that by providing at one end of the secondary armature reaction axis XY a compensating-exciting winding 23 having approximately $$\frac{N}{8} \text{ turns}$$

and by connecting this winding in series with the secondary brushes 5 and 6 so as to cause it to excite $$\frac{N}{8}I_2 \text{ ampere turns}$$

in the opposite direction to the secondary armature reaction, there will be produced a four-pole additional flux corresponding to a number $$\frac{N}{8}I_2$$

of total magnetizing ampere-turns of which one half, represented by Aa (Fig. 4), excites the half-machine X while the other half Bb excites the half-machine Y. In the present instance this additional flux must strengthen the reference flux to allow the voltage to reach its normal value, hence the winding 23 is necessarily to be provided on pole X.

The voltage having reached its normal value, if the speed of the generator is caused to increase, the voltage has thus a tendency to increase above normal; this instantly results in a corresponding decrease of circulating currents $I_1$ and $I_2$ and thus causes the voltage to return to its normal value.

If a load is connected across terminals 20 and 22, the generator supplies a load current the direction of which in the armature conductors is shown at $I_3$. The applied load causes the voltage to show a tendency to decrease which now results in a corresponding increase of circulating currents $I_1$ and $I_2$, the effect of which is to restore the voltage to its normal value.

If the generator speed is further increased to such an extent that the reference flux is higher than necessary, the currents $I_1$ and $I_2$ reverse in direction as well as the additional flux which now becomes subtractive.

More generally any variation in the speed or load automatically modifies the resultant flux of the machine in such a direction as to reduce the flux unbalance between the poles X and Y whereby the output voltage is kept at a substantially constant value.

It will be noted that due to the presence of the circulating currents the brushes are unequally loaded, each brush carrying one half the load current plus or minus the amount of corresponding circulating current. Thus the value of current $I_Z$ in brush 5 is $$\frac{I_3}{2}-I_2$$

while that of current $I_Q$ in brush 6 is $$\frac{I_3}{2}+I_2$$

In order to make the ampere-turns of the winding 23 independent of the load current, it is only necessary to have the terminal 22 connected with the brush connection 21 in a point 24 of the winding 23 which divides the latter in two sections having substantially equal numbers of turns; hence the actions of both these sections are cumulative as regards current $I_2$ while they are differential and cancel each other as regards current $I_3$.

Adjustment of the normal rated voltage $U_0$ is obtained by varying the level of the reference flux by means of a magnetic device such as that already described with reference to Fig. 3, or by means of a rheostat 25 adapted to vary the resistance of the circuit including the regulation winding 9.

When the slopes of curves $\phi_X$ and $\phi_Y$ are different, a symmetrical distribution of the resultant flux is maintained by rating the additional ampere-turns which respectively excite the half-machines X and Y suchwise that they are in the reverse ratio of the slopes of these curves. With diverging curves such as $\phi_X$ and $\phi_{Y^1}$ the additional ampere-turns which excite the half-machine Y will be increased, for instance by shunting the secondary brushes 5 and 6 with a suitable resistor 26 so as to increase the circulating current between these brushes and thence the secondary armature reaction ampere-turns. With converging curves such as $\phi_X$ and $\phi_{Y^2}$ it is only necessary to increase suitably the number of turns of the compensating-exciting winding 23.

Figure 6:
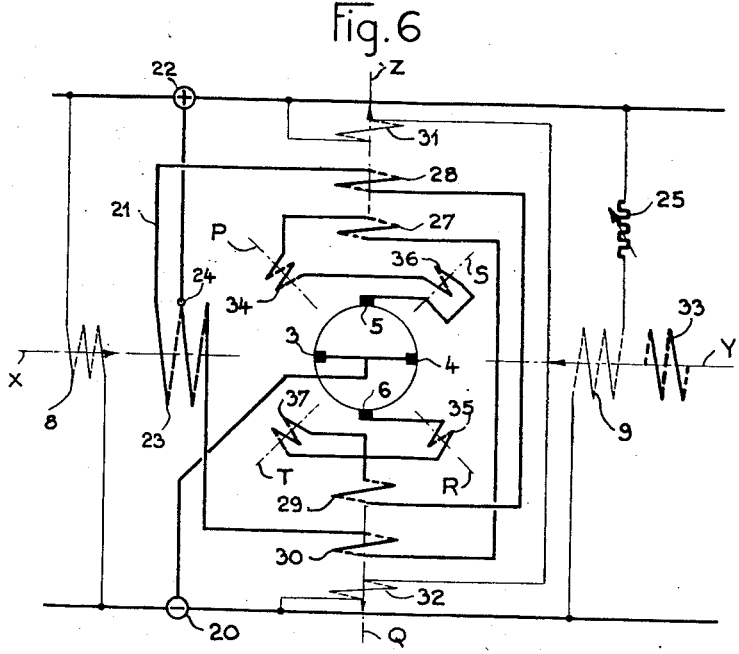
Figs. 6, 7 and 8 are various circuit diagrams for the same machine.

As mentioned above the brushes 5 and 6 are unequally loaded due to the presence of the circulating current $I_2$. A reduction of this load unbalance may be obtained by increasing the number of turns by which the additional flux is excited whereby the secondary circulating current $I_2$ is correspondingly reduced. This will be illustrated in Fig. 6, wherein, as well as in the next Figs. 7 and 8, the direction of rotation and the current distribution are assumed to be the same as in Fig. 5. As shown in Fig. 6 the machine is further provided with auxiliary windings 27, 28 and 29, 30 arranged in pairs on poles Z and Q, the windings of each pair being respectively traversed by the currents $I_Z$ and $I_Q$ so as to produce cumulative excitations as regards circulating current $I_2$ and differential excitations as regards load current $I_3$.

In order to reduce the amount of circulating current $I_2$, particularly during the building-up period of the generator where this current is relatively high, the field structure may be provided with normal shunt windings which produce an excitation in the same direction as the reference flux, such as the windings shown at 31 and 32 on poles Z and Q.

In the case where two or more generators are to be operated in parallel, a proper division of the load between the generators is secured by providing each of them with a neutralizing winding similar to that which equips the conventional generator voltage regulators. Such neutralizing winding should act along the axis XY of the initial flux unbalance and therefore may be provided on pole Y as shown in 33. The method of connecting the neutralizing winding in the balancing circuit of the parallel coupled generators is well known in the art, and therefore has not been illustrated.

In order to secure satisfactory commutation, the machine may be provided with commutation windings. The current $I_1$ being small compared with the currents $I_2$ and $I_3$, it is only necessary in practice to produce the commutating field in dependence upon the currents $I_2$ and $I_3$ only. To this end the interpoles P, R, S and T are provided with commutation windings 34, 35, 36 and 37 (Fig. 6). Each of them will be energized by the same current which magnetizes the armature conductors lying in regard of the corresponding pole, i. e. by current $I_Z$ in the case of windings 34 and 36 and by current $I_Q$ in the case of windings 35 and 37. The number of turns of these windings will be $$\frac{N}{16}$$

times a practical coefficient K greater than one, suchwise that the ampere-turns of each winding exceed the corresponding cross-magnetizing armature ampere-turns by the amount necessary for the establishment of the commutating field.

Figure 7:
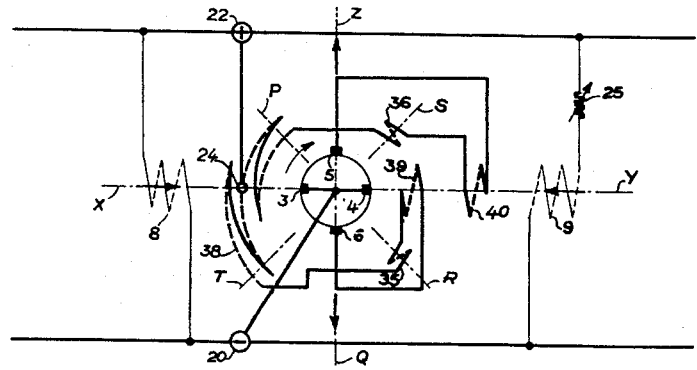

The Fig. 7 shows a modified form of the generator of Fig. 6, in which a single winding 38 assumes at once the functions of the compensating-exciting winding 23 and the commutation windings 34 and 37. Reverting briefly to Fig. 6 it will be recognized that the commutation winding 34 and the one section of winding 23 which are traversed by the current $I_Z$ produce excitations which are in the same direction with respect to the armature and that the same is true for the commutation winding 37 and the other section of winding 23 which are traversed by current $I_Q$. Thus all three windings 34, 23 and 37 may be replaced by a single winding having one section wound about poles X and P and another section wound about poles X and T; in order to maintain the proper commutating field each of these sections will receive $$K\frac{N}{16} \text{ turns}$$

The resulting increase of the additional ampere-turns on pole X will be compensated for by providing a suitable convergence between curves $\phi_X$ and $\phi_Y$, or if necessary by producing in pole Y a complementary excitation with auxiliary windings 39 and 40 energized by the secondary circulating current or with a shunting resistor such as 26 (Fig. 5). Such an arrangement affords an appreciable saving in copper and coil space, particularly in machines which are greater in length than in diameter.

As regards the structure of the pole X when the machine is to be provided with interpoles, it is important to note that the function of interpoles P and T may advantageously be assumed by a radial magnetic shunt, such as 11 (Fig. 1) or 11a (Fig. 2), located in the normal interpole position on either side of the saturated core. Such structure is particularly well adapted to the use of the multi-purpose winding 38.

Figure 8:
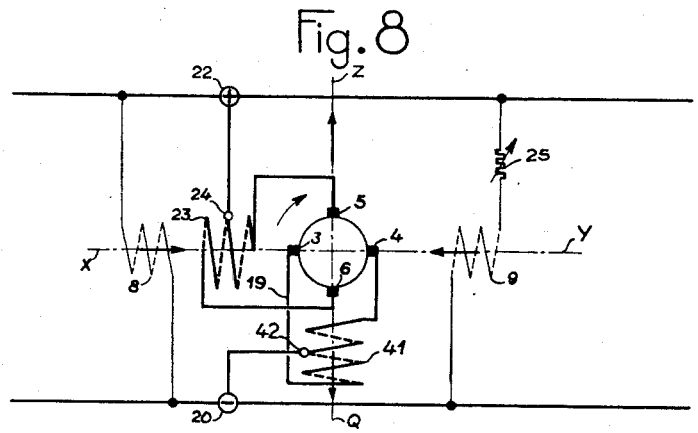

In the preceding examples the function of primary circulating current $I_1$ consists in exciting the armature conductors in order to cause the latter to produce by armature reaction an unbalance flux between poles Z and Q. The current I₁ may also be utilized to excite a field circuit serially connected in brush connection 19 and adapted to assist the primary armature reaction, which increases the sensitivity of the regulating function of the machine. The Fig. 8 illustrates the use of such a field circuit in a machine according to the invention. This field circuit shows the peculiarity of consisting in a single winding 41 arranged on the one of poles Z and Q, in which the component of primary armature reaction flux and the component of additional flux act in the same direction, in fact the pole Q, whereby said winding 41 is caused to reinforce at once both these components. To make the ampere-turns of winding 41 independent of load current I₃, the terminal 20 will be connected with brush connection 19 at the midpoint 42 of winding 41.

The machines described so far are adapted to regulate an inherent variable condition, in the occurrence, their output voltage. There will be now described a machine based on the same principle but adapted to operate as an exciter to regulate a variable condition of an external system. To this end the reference flux of the exciter will be excited in dependence upon the condition to be regulated and the secondary circulating current of the exciter will be used to control the system. To produce rotation of the exciter, the latter may be operated as a separate motor or driven by a suitable source of mechanical power.

Figure 9:
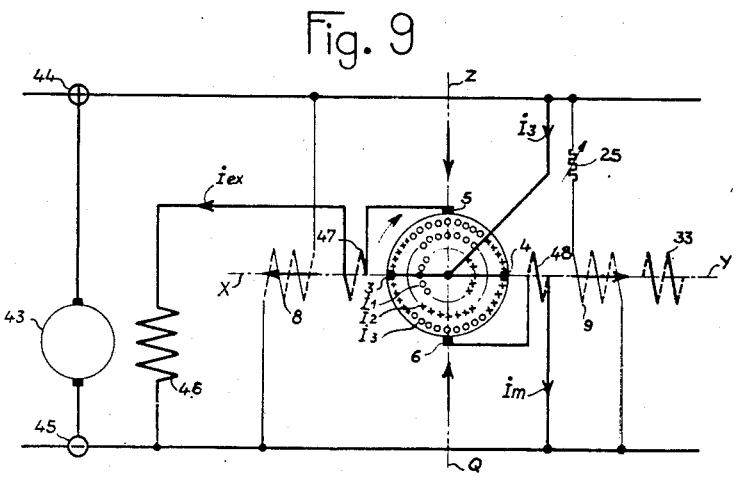
Fig. 9 shows the circuit diagram of a machine according to the invention adapted to operate as a regulator-exciter for a separate generator.

The Fig. 9 illustrates the application of such an exciter to the voltage regulation of a generator. The latter is represented schematically by its armature 43 connected to output terminals 44 and 45 and a field circuit 46. The exciter comprises a field structure shown by the pole axes X, Y, Z and Q, and an armature 2 with two primary brushes 3 and 4 and two secondary brushes 5 and 6. The generator field 46, having one end connected to one terminal 45 of the generator, is serially connected in the circuit of the secondary brushes; one secondary brush 5 is therefore connected with the other end of the generator field 46, while the other secondary brush 6 is connected with terminal 45. The primary brushes 3 and 4 are interconnected through a brush connection 19 which in turn is connected with terminal 44. The windings 8 and 9 on poles X and Y are energized under the generator voltage so as to produce in the exciter a reference flux shown by the arrows on the pole axes. The generator being driven builds up with its residual magnetism. The increasing voltage of the generator is applied to the windings 8 and 9 and to the armature 2 of the exciter, which causes the latter to start for example clockwise. It will be noted that the total current I₃ entering the armature 2 at brushes 3 and 4 is the sum of the current I_ex flowing out of secondary brush 5 and of the current I_m flowing out of secondary brush 6. The current I_ex represents the field current of the generator, while the current I_m represents the current absorbed by the exciter to run itself as a motor. As long as the generator voltage has not reached the normal value corresponding to a symmetrical distribution of the exciter reference flux, there exists between the primary brushes 3 and 4 a circulating current I₁ which in turn generates in the circuit of secondary brushes a circulating current I₂ which reinforces the field current I_ex of the generator. It will be noted in this respect that the value of current I_ex is $$\frac{I_3}{2} + I_2$$

while that of current I_m is $$\frac{I_3}{2} - I_2$$

The generator voltage thus reaches its normal value and is maintained thereto according to the same regulation process as already described. In the present instance, the secondary armature reaction due to circulating current I₂ is not useful to the operation of the exciter and therefore will be neutralized by suitable compensating windings. From another stand-point it is convenient to use the load current I₃ of the exciter to compound the latter in order to increase its starting torque. Both compensating and compounding effects may be obtained from only two windings 47 and 48 energized by the currents I_ex and I_m and arranged on poles X and Y respectively so as to produce a component of flux proportional to circulating current I₂ in the opposite direction to the secondary armature reaction, and a component of additional flux proportional to current I₃ in the same direction as the reference flux.

The exciter may be further provided with other windings adapted to increase its flux such as the windings 31 and 32 (Fig. 6).

In the case where two or more generators are to be operated in parallel, their respective exciters will be provided with a neutralizing winding 33.

In the various embodiments of the invention which have been described so far it has been assumed that the ampere-turns of the various windings or pairs of windings were made independent of the load current. It is important to note however that in certain application it is advantageous to produce one or more excitations proportional to the load current and acting along one or both armature reaction axes. This may be obtained by providing the machine with auxiliary windings energized by the load current or by suitably modifying the ratio between the numbers of turns in the windings of one pair, or in the two sections of the same winding.

As regards the saturated core of pole X it will be noted that it is not essential but convenient to have the core 7 excited in dependence upon the same condition as pole Y and that saturation thereof may also be obtained from an external source of electric energy. Such core may also consist in a magnet, which permits of reducing or eliminating the associated saturation winding.

It will be noted also that the machines can also be used for the regulation of current, speed or other variable condition which may be controlled electrically.

It is to be understood that the invention is also applicable to machines having a number of poles greater than and in particular a multiple of four, and that various modifications thereof may be made without departing from its principles.

Having now described my invention what I claim as new and desire to secure by Letters Patent is:

1. A direct current regulating machine having a field structure with a plurality of main poles of successive alternate polarities including a first pole of one polarity adapted to produce a substantially constant flux and a second pole of the same polarity adapted to produce under excitation by a variable condition to be regulated a flux variable over a range including the value of substantially constant flux whereby said two poles are equal in strength for a definite value of said variable condition and any departure of the latter from said definite value produces between these two poles a flux unbalance correlated to said departure, and means responsive to said flux unbalance for controlling said variable condition so as to secure regulation thereof, said first pole including a core excited to operate normally at magnetic saturation and a magnetic shunt adapted to form a parallel flux path with respect to said core whereby a variable additional flux may be caused to pass in said magnetic shunt in order to vary the main flux of the machine, without altering the saturated state of said core.

2. A machine as claimed in claim 1, which comprises means for varying the reluctance of said core in order to control the value of said substantially constant flux.

3. A machine as claimed in claim 1, wherein said second pole is excited through a regulation winding provided on this pole and energized in dependence upon said variable condition.

4. A machine as claimed in claim 1, wherein said core is excited through a saturation winding provided on this core and energized in dependence upon said variable condition.

5. A direct-current regulating machine having two poles of one polarity and two poles of another polarity, an armature with two interconnected equipolar primary brushes associated with the two former poles and two interconnected equipolar secondary brushes associated with the two latter poles, and two terminals connected with the primary and secondary brush connections respectively, wherein a first pole of one polarity comprises a core and a magnetic shunt associated therewith, said core being excited to operate normally at magnetic saturation to cause this pole to produce a substantially constant flux, while the second pole of one polarity is excited in dependence upon a variable operating condition of the machine, the reluctances of said core and said magnetic shunt being so rated that the value of said substantially constant flux is included in the variable flux range of the second pole, whereby the four-pole flux produced under excitation of these two poles has a symmetrical distribution for a given value of the variable condition and any departure of the latter from said given value produces between these two poles a flux unbalance correlated to said departure; and armature circulating current responsive field exciting means serially connected in at least one brush connection so as to produce under action of said flux unbalance a four-pole additional flux for varying the flux of the machine in such a direction as to reduce said flux unbalance.

6. A machine as claimed in claim 5, wherein said additional flux is excited in dependence upon the secondary circulating current generated by primary armature reaction in the secondary brush connection through the medium of a compensating-exciting winding serially connected in the secondary brush connection and arranged on said first pole to act in the opposite direction to the secondary armature reaction, the terminal of the machine appertaining to said secondary brush connection being connected therewith in a point intermediate the ends of said compensating-exciting winding which divides the latter in two sections.

7. A machine as claimed in claim 6, which comprises auxiliary windings serially and symmetrically connected in the secondary brush connection so as to be energized by said secondary circulating current for assisting said additional flux.

8. A machine as claimed in claim 6, which comprises four interpoles and four commutation windings serially and symmetrically connected in the secondary brush connection so as to excite a commutating field proportional to said secondary circulating current and load current.

9. A machine as claimed in claim 6, which comprises four interpoles, said compensating-exciting winding having one section wound about said first pole and an adjacent interpole and the other section wound about the same pole and the other adjacent interpole, while the other two interpoles are provided with two commutation windings, the latter and the compensating exciting winding being arranged so as to produce a commutating field in dependence upon the secondary circulating current and the load current.

10. A machine as claimed in claim 6, which comprises an auxiliary winding serially connected in the primary brush connection so as to produce a component of excitation responsive to the primary circulating current, said auxiliary winding being arranged on the one pole of the other polarity in which the primary armature reaction flux is in the same direction as the additional flux so as to reinforce both these fluxes, the terminal appertaining to said primary brush connection being connected therewith in a point intermediate the ends of said auxiliary winding.

11. A machine as claimed in claim 6, to be used as a generator with regulated output voltage and to be coupled in a parallel operated generator system provided with a balancing circuit, said machine comprising a neutralizing winding to be connected in said balancing circuit, and said neutralzing winding being associated with the flux path of the secondary armature reaction.

12. An exciter for controlling the field of a generator the output voltage of which is to be regulated, said exciter having two poles of one polarity and two poles of the other polarity, an armature with two interconnected equipolar primary brushes associated with the two former poles and two interconnected equipolar secondary brushes associated with the two latter poles, wherein a first pole of one polarity comprises a core and a magnetic shunt associated therewith, said core being excited to operate normally at magnetic saturation to cause this pole to produce a substantially constant flux, while the second pole of one polarity is excited in dependence upon the generator voltage, the reluctances of said core and said magnetic shunt being so rated that the value of said substantially constant flux is included in the variable flux range of the second pole, whereby the four-pole flux produced under excitation of these two poles has a symmetrical distribution for a definite value of the generator voltage and any departure of the latter from said definite value produces between these two poles a flux unbalance correlated to said departure; means for supplying the generator voltage between the primary and secondary brush connections of the exciter in order to secure motor operation of the latter; means for connecting the generator field in the secondary brush connection in order to control the flux of the generator with the secondary circulating current of the exciter in such a direction as to reduce said flux unbalance; and field windings energized by said secondary current for compensating the secondary armature reaction of the exciter.

13. An exciter as claimed in claim 12, wherein said field windings consist in two windings serially connected in the secondary brush connection on either side of the exciter armature and arranged on said first and second poles respectively so as to produce a component of flux proportional to the secondary circulating current for compensating the secondary armature reaction and a component of additional flux proportional to the load current of the exciter for compounding the latter.

References Cited in the file of this patent

UNITED STATES PATENTS

| | | |
|---|---|---|
| 2,148,296 | Hull | May 21, 1939 |
| 2,385,670 | Whiting | Sept. 25, 1945 |
| 2,525,486 | Harding et al. | Oct. 10, 1950 |
| 2,549,648 | Tyrner | Apr. 17, 1951 |